Aug. 25, 1931.  O. M. HOCH  1,820,021
TRIP MECHANISM FOR SHEET CUTTING MACHINES
Filed Dec. 12, 1928  4 Sheets-Sheet 1

INVENTOR
BY
ATTORNEY

Aug. 25, 1931.      O. M. HOCH      1,820,021
TRIP MECHANISM FOR SHEET CUTTING MACHINES
Filed Dec. 12, 1928      4 Sheets-Sheet 2

Fig. 2.

INVENTOR
BY
ATTORNEY

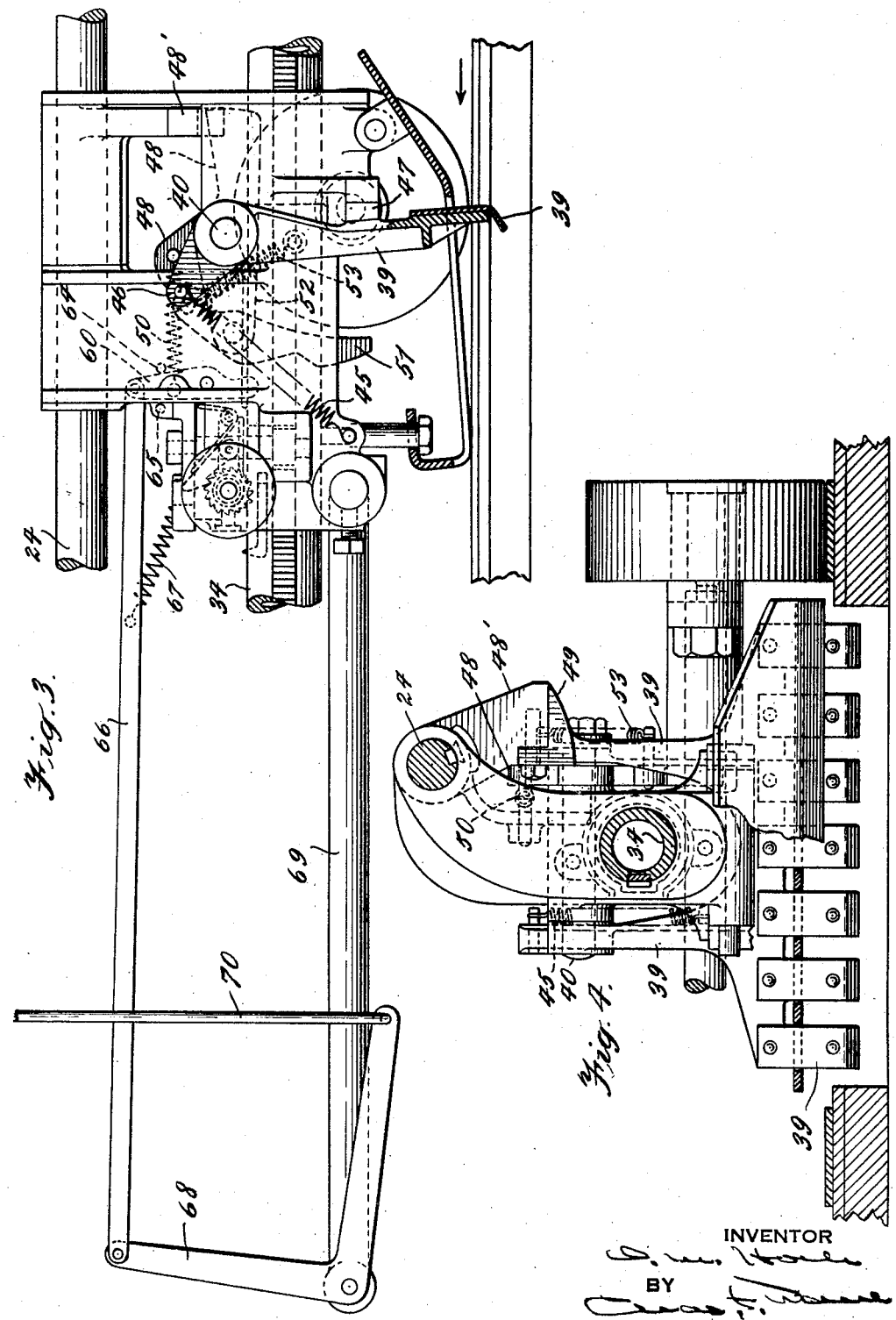

Aug. 25, 1931.  O. M. HOCH  1,820,021
TRIP MECHANISM FOR SHEET CUTTING MACHINES
Filed Dec. 12, 1928   4 Sheets-Sheet 4
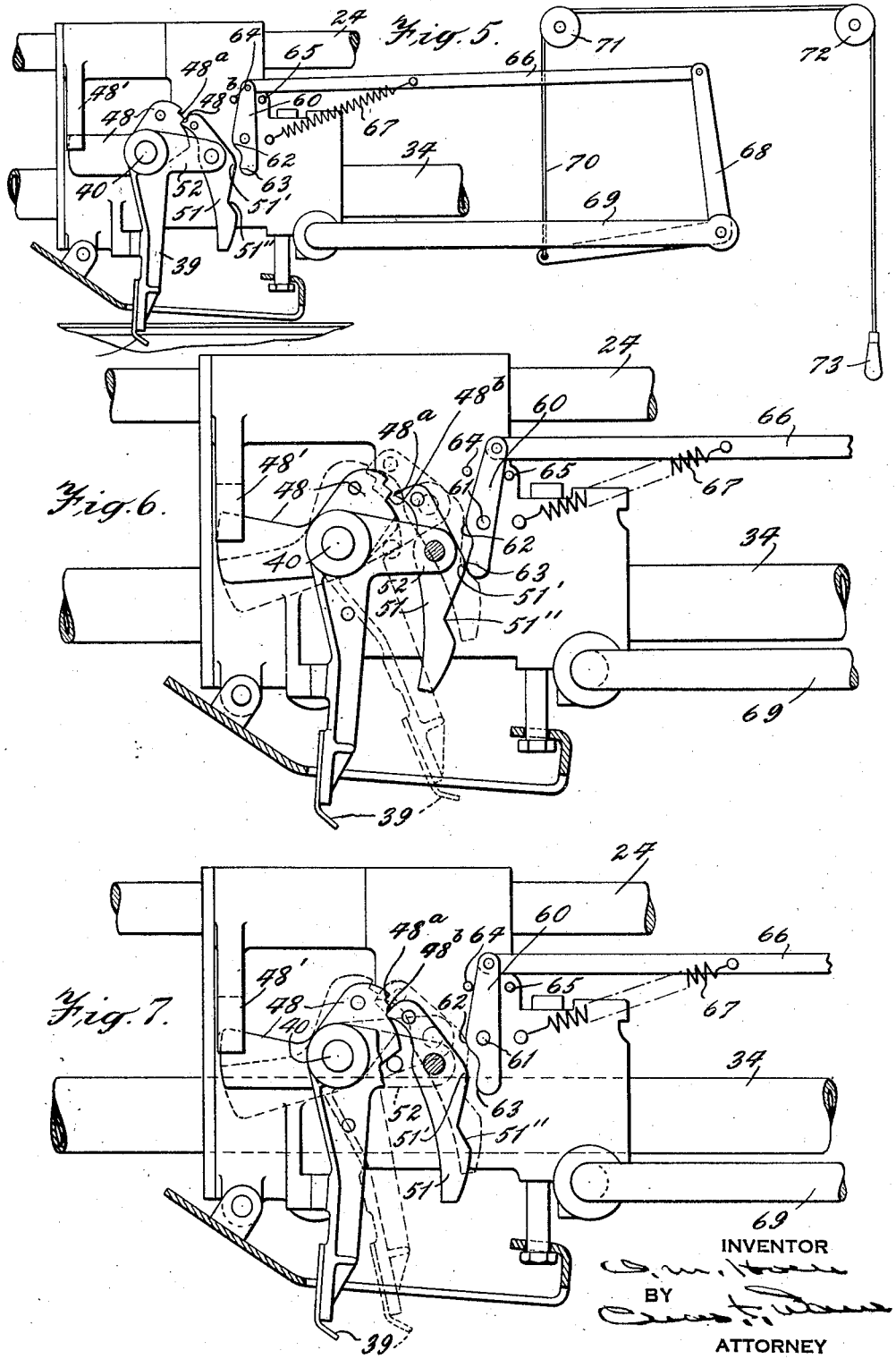
INVENTOR
BY
ATTORNEY Patented Aug. 25, 1931

1,820,021

UNITED STATES PATENT OFFICE

OTTO M. HOCH, OF ROCHESTER, NEW YORK, ASSIGNOR TO M. D. KNOWLTON COMPANY, OF ROCHESTER, NEW YORK, A CORPORATION OF NEW YORK

TRIP MECHANISM FOR SHEET CUTTING MACHINES

Application filed December 12, 1928. Serial No. 325,584.

The invention relates to trip mechanism for machines for shearing sheet material, of the general type shown in the patents to Hoch No. 1,296,803 and Hawkins No. 1,321,207, and has for its object to provide such trip mechanism with means for varying the time of operation thereof to control the actuation of the clutch members, which sets in motion the shear mechanism for operating upon the web of material, so that, when the speed of the machine is temporarily reduced for any reason, the engagement of the clutch members may be delayed and a sufficient length of the web be permitted to pass between the shearing elements, whereby the cutting of short lengths from the web, which would be wasted, is avoided.

The invention is illustrated in the accompanying drawings, in which:—

Fig. 2 is an enlarged vertical section on line 2—2 of Fig. 1.

Fig. 3 is an enlarged detail, partly in section, of the trip mechanism.

Fig. 4 is an end sectional elevation of the parts shown in Fig. 3 viewed from the right.

Figs. 5, 6 and 7 are side elevations of the trip mechanism viewed from the opposite side of the machine from that shown in Fig. 3, certain of the elements being omitted for purposes of clearness.

Figure 1:
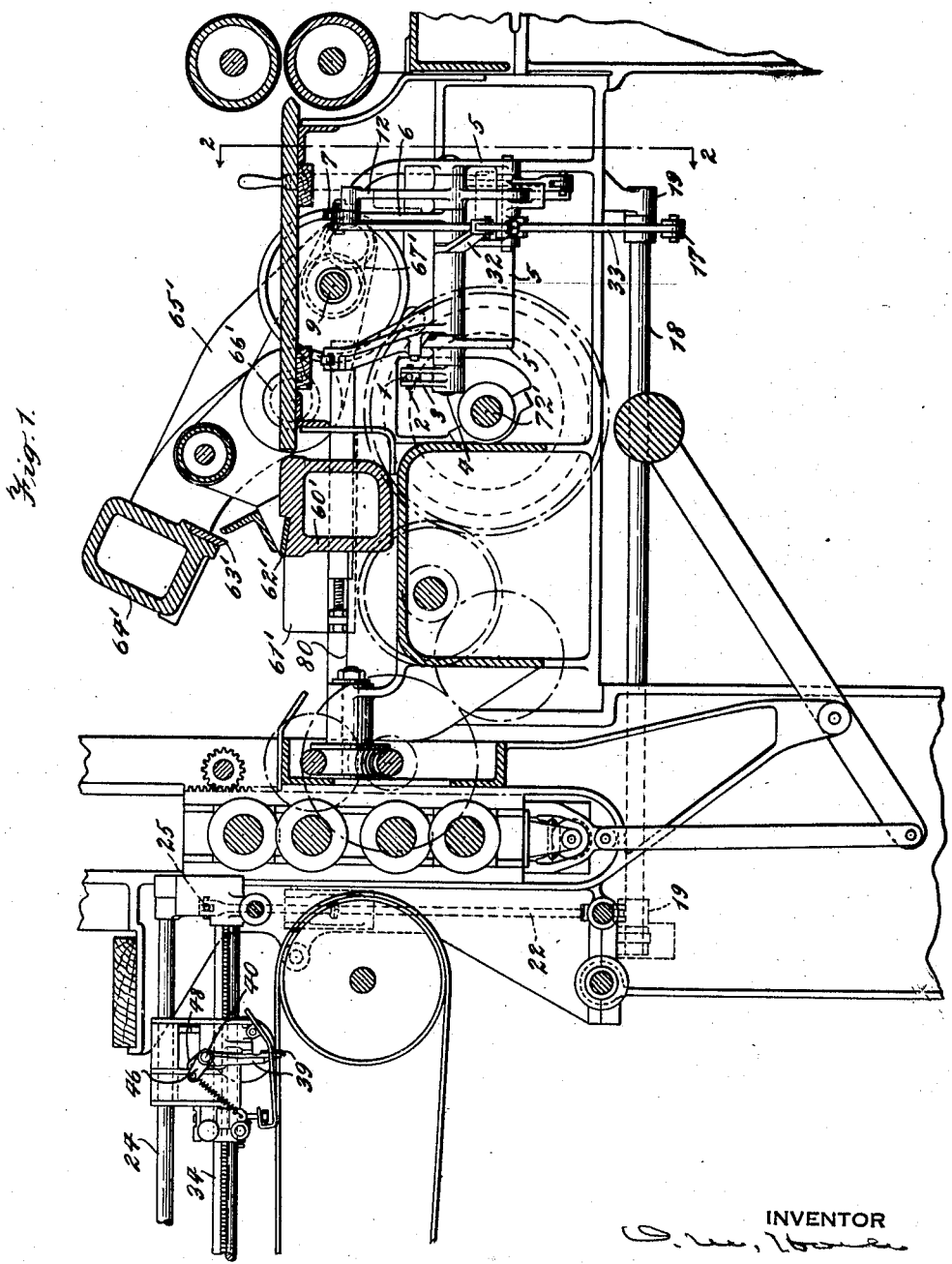
Fig. 1 is a partial longitudinal vertical section of the machine having the invention applied thereto.

The machine to which my present invention is applied is substantially the same as that disclosed in the Hawkins patent aforesaid, to which reference may be had, and it involves a lower cutter bar 60 extending transversely of the machine and carrying a shear blade 62, with which cooperate the upper shear blade 63 carried by a swinging or oscillating frame 64, the bar 60 and the oscillating frame 64 being carried in frame members 61, which are mounted for reciprocating motion on guides 80 formed on the bed of the machine. Reciprocation of both cutter members and the oscillation of the upper cutter frame is effected by a transversely extending shaft 9 having at its opposite ends crank arms 67 which are connected directly to the ends of the arms 65 of the upper cutter frame. The shaft 9 in turn is actuated through suitable gearing (not shown) from a shaft 72', the rotation of which latter is controlled by a friction clutch comprising members 75 and 76, and the operation of the clutch being controlled by the sheet trip mechanism.

The clutch is controlled by a clutch rod 1 pivoted at 2 on an arm 3 secured to a shaft 4 supported in a bracket 5 carried by the frame of the machine. Mounted loosely on the shaft 4 is a cam lever 6 which carries a roller 7 at its upper end, which roller is adapted to cooperate with a cam 8 on shaft 9, which is provided with a high and low portion, as shown in Fig. 2 of the drawings. This cam roller is normally retained in engagement with the surface of the cam by a spring 10 which is secured to the cam lever and to a stationary part of the machine at 11. An arm 12 is secured to the shaft 4 and carries at its upper end a pivoted pawl 13, which is arranged to engage a wear block 14 on the cam lever 6, which pawl is adapted to be moved out of engagement with the wear block 14 by a rod 15 which is secured to the pawl and has a lost motion connection at 16 with an arm 17 rigidly supported on the shaft 18, which shaft is mounted in suitable brackets 19 on the frame of the machine. A second arm 20 is fixed to shaft 18 and is connected to a bell crank lever 21 by a connecting link 22. This lever 21 is attached to a crank arm 23, which is mounted rigidly on an oscillatory shaft 24, by means of a connecting rod 25. The shaft 24 is carried by the casing of the trip device, as shown in Figs. 2 to 7 of the drawings. The rod 25 passes through a bracket 26 and is provided with a collar 27, between which collar and bracket a coil spring 28 is mounted, which spring serves, when released, to move the rod 25 and through the connecting elements lifts the pawl 13 out of engagement with the wear block 14 and permits the clutch members to be engaged, so that the shearing mechanism will be actuated.

In order that the parts may be reset and the spring 28 again placed in compression, a cam lever 29 is loosely mounted on the shaft 4 and is provided with a roller 30 which is normally maintained in engagement with the face of cam 8 by a spring 31. Rigid with and extending in angular relation to the cam lever 29 is an arm 32 which is connected, by a lost motion connection through a link 33, with the arm 17. Thus when the cam 8 is rotated after the clutch members have been engaged, as previously described, the riding of the roller 30 on the high portion of the cam 8 will cause the downward movement of the link 33 and the consequent placing of the spring 28 under compression, so that it will be ready for a subsequent operation.

As described in the prior Hawkins patent aforesaid, the rod 25 is permitted to move under the influence of spring 28 at the proper time to effect engagement of the members of the clutch and, therefore, start the shearing operation under the control of a sheet trip, which is designed to effect the release of the shaft 24. In the particular form of the sheet trip shown in the patents aforesaid, the sheet trip is actuated by a forward edge of the web of material fed through the machine and, so long as the speed of the machine is maintained constant, the length of the sections cut from the web is uniform. It was found, however, that with this old form of trip mechanism, when the machine was slowed down suddenly, an insufficient length of the web will pass between the shear members before the cutting operation is effected, so that the cut sheet will be short and must be discarded for this reason. The present invention is designed to overcome this difficulty by providing the trip mechanism with means for delaying the engagement of the clutch members, when the machine is slowed down, so that a sufficient length of stock may be fed between the shear elements before the latter are brought into action to sever the sheet, so that the sheet cut after the slowing down of the machine will be at least as long as the regular length sheets cut at the normal speed of operation of the machine.

To this end, the trip mechanism comprises a trip plate 39 loosely pivoted on the shaft 40, mounted in the trip casing, which latter is longitudinally adjustable on a shaft 34, as described in the Hoch patent hereinbefore referred to. The pivoted trip plate 39 is normally held in engagement with a stop 47 by means of a spring 45, which is attached to an arm 46. Pivoted loosely on the shaft 40 is a latch 48, which is of angular form, and is provided with an extending portion arranged to engage a latch arm 48', which is keyed to the shaft 24. The latch 48 is normally held in the path of movement of the latch arm 48' by a spring 50, so that the movement of the latch arm under the influence of spring 28 is prevented. The opposite end of the latch 48 is provided with two notches 48$^a$ and 48$^b$ adapted to be selectively engaged by a pawl 51, which is pivoted to an extension 52 of the trip lever 39, the upper end of the pawl being normally held in engagement with a notch in the adjacent end of the latch, by means of a spring 53, which is shown in Fig. 3 as connected to the end of the pawl and to the body of the trip plate. The notches 48$^a$ and 48$^b$ are in stepped relation and, in the normal operation of the machine, the pawl engages the first notch 48$^b$, so that, when the trip plate is actuated by an advancing sheet, the pawl 51 will swing the latch 48 out of engagement with the latch arm 48', thereby permitting the clutch members to be engaged and the cutting operation to be effected in the same manner as described in the Hoch and Hawkins patents aforesaid.

When the machine is running at high speed, the shear has come to rest at a point relatively near the cutting position. Should the speed of the machine be suddenly reduced for any reason, the first sheet to be cut under such reduced speed conditions would be short, because the rest position of the shear being near the cutting position, a minimum length of web would pass through the shear during the constant time interval that it takes the trip mechanism and clutch to act. This sheet would likely be too short for use with the particular batch being cut, but this discrepancy may be corrected and the sheet first cut after the slowing operation will be at least as long as the standard sheets, if the pawl 51 be engaged with the upper or second notch 48$^a$ on the latch, so that the trip plate 39 will travel relatively a greater distance in order to free the latch from the latch arm, and the proper length of the sheet will pass through the shears before the latter are operated. This engagement of the pawl with the upper notch 48$^a$ is effected by means of a lever 60 pivoted at 61 to the trip casing adjacent the pawl, the lever constituting the abutment which trips the pawl in the resetting operation. The lever 60 is provided with a projection 62 substantially opposite the pivoted point, which, in the normal setting of the trip mechanism, engages a projection 51' on the pawl 51, as the latter swings upward, so that the pawl will be tripped out of engagement with the notch 48$^b$ and permit the latch 48 to be swung back into position to reengage the latch plate, when the latter has been returned to normal position. The lever 60 is also provided with a projection 63 on its lower end, which, when the lever is swung on its pivot, engages the projection 51' on the pawl and swings the latter until the end thereof moves out of notch 48$^b$ and snaps into position for subsequent engagement with notch 48ª, as indicated in Fig. 6. In order to operate the lever 60, the latter is connected at its upper end by means of a link 66 to a bell crank 68 pivoted on extension bracket arm 69, which bell crank is connected at its opposite end to a pull cord 70 running over pulleys 71 and 72, so that the handle 73 on the end of the pull cord will be within easy reach of the operator stationed at the discharge end of the machine. The lever 60 is normally held against a stop 64 by means of a spring 67 connected to the link 66 and the trip casing, the movement of the lever in the other direction being limited by a similar stop pin 65 mounted on the trip casing. By reference to Fig. 6, it will be seen that the swinging movement of the trip plate 39 to the point at which the latch arm 48' is released, when the pawl has been shifted to the upper notch, is considerably greater than the movement of said plate when the machine is operated under normal conditions and the pawl is engaged with notch 48ᵇ, as in Fig. 7. This delay in engagement of pawl 51 with a notch in the latch 48 provides an additional time interval before the latch 48 is moved out of engagement with the latch arm 48', which, as stated, permits the requisite length of stock to pass between the shearing means before the latter are operated, so as to insure a sheet of at least the same length as the standard sheets cut during the normal operation of the machine.

As stated, the normal setting of the trip mechanism requires that the pawl 51 be engaged with the lower or first notch 48ᵇ, as in Figs. 5 and 7, when the machine will cut sheets of uniform length from the stock in the same manner as described in the prior patents aforesaid. Should the operator observe that the machine has been slowed down suddenly, he immediately pulls on the cord 70, thereby causing the bell crank 68 and the link 66 to swing the lever 60 to the position indicated in Fig. 6 until it is arrested by the stop 65. The lower end 63 of the lever engaging the projection 51' on the pawl moves the nose of the pawl out of engagement with the notch 48ᵇ and to the position shown in Fig. 6 to cause the nose of the pawl to be in line to engage the second or upper notch 48ª, so that the trip plate will have to move through a greater distance before the latch is disengaged from the latch arm 48', as explained. When the trip plate is swung to its extreme position, the shouldered portion 51'' of pawl 51 engages the lower end of the lever 60 which acts as a stop to move or shear the pawl out of engagement with the upper notch 48ª to permit the latch to be returned to its normal position. After the severed sheet has been caused to pass out at a considerably greater speed than that of the oncoming web, the trip plate, which has been riding on the sheet, is free to be brought back to its initial or vertical position by means of spring 45.

What I claim is:

1. In a machine of the class described, the combination with shearing means and actuating mechanism therefor including a clutch, of a clutch-controlling mechanism including a latch normally holding the clutch inoperative, a trip member having a shiftable connection with the latch, and means for selectively operating said connection to trip the latch at different points in the travel of the trip member.

2. In a machine of the class described, the combination with shearing means and actuating mechanism therefor including a clutch, of a clutch-controlling mechanism including a latch normally holding the clutch inoperative, a trip lever having a pawl connection with the latch, and means for selectively operating the pawl to trip the latch at different points in the travel of the trip lever.

3. In a machine of the class described, the combination with shearing means and actuating mechanism therefor including a clutch, of a clutch-controlling mechanism including an oscillatory latch arm, a latch for preventing movement of the latch arm, a trip lever having a pawl connection with the latch, and means for selectively operating said pawl to disengage the latch and latch arm at different points in the travel of the trip lever.

4. In a machine of the class described, the combination with shearing means and actuating mechanism therefor including a clutch, of a clutch-controlling mechanism, an oscillatory shaft having a latch arm rigid therewith, means connecting said shaft with the clutch-controlling mechanism, a latch adapted to extend into the path of movement of the latch arm, means for maintaining the latch in such position, and selectively operated means for shifting it from such position at different time intervals.

5. In a machine of the class described, the combination with shearing means and actuating mechanism therefor including a clutch, of a clutch-controlling mechanism, an oscillatory shaft, a latch therefor and a trip lever mounted on a common pivot, means connecting said shaft with the clutch-controlling mechanism, a pawl carried by the trip lever engaging the latch, and means for selectively operating said pawl to disengage the latch and oscillatory shaft at different points in the travel of the trip lever.

6. In a machine of the class described, the combination with shearing means and actuating mechanism therefor including a clutch, of a clutch-controlling mechanism, an oscillatory shaft having a latch arm rigid therewith, means connecting said shaft with the clutch-controlling mechanism, a latch arranged to engage said latch arm to prevent movement of the shaft, said latch having spaced notches, a trip lever having a pawl cooperating with said notches of the latch, and means for selectively engaging the pawl with the notches on the latch and thereafter releasing the pawl.

7. In a machine of the class described, the combination with shearing means and actuating mechanism therefor including a clutch, of a clutch-controlling mechanism, an oscillatory shaft having a latch arm rigid therewith, means connecting said shaft with the clutch-controlling mechanism, a pivoted latch cooperating with the latch arm to lock the latter, said latch having a double notched extension, a trip lever having a pawl cooperating with the notches on the latch to move said latch out of engagement with the latch arm, and means for selectively engaging the pawl with said notches whereby the time of releasing the latch from the latch arm may be varied.

8. In a machine of the class described, the combination with shearing means and actuating mechanism therefor including a clutch, of a clutch-controlling mechanism, an oscillatory shaft having a latch arm rigid therewith, means connecting said shaft with the clutch-controlling mechanism, a pivoted latch having a section cooperating with the latch arm to lock the latter and a section provided with spaced notches, a trip lever having a pivoted pawl cooperating with the notches on the latch to move the latter out of engagement with the latch arm, and a pivoted lever having an abutment thereon for shifting the engagement of the pawl and the notches in the latch plate to vary the time of releasing the latch from the latch arm.

9. In a machine of the class described, the combination with shearing means and actuating mechanism therefor including a clutch, of a clutch-controlling mechanism, an oscillatory shaft having a latch arm rigid therewith, means connecting said shaft with the clutch-controlling mechanism, a pivoted latch having a section cooperating with the latch arm to lock the latter and a section provided with spaced notches, a trip lever having a pivoted pawl cooperating with the notches on the latch to move the latter out of engagement with the latch plate, a pivoted lever having an abutment thereon for shifting the engagement of the pawl and the notches in the latch plate to vary the time of releasing the latch from the latch arm, and means for operating said lever.

10. In a machine of the class described, the combination with shearing means and actuating mechanism therefor including a clutch, of a clutch-controlling mechanism including a latch normally holding the clutch inoperative, said latch having spaced notches, a trip lever having a pawl cooperating with said notches of the latch, and means for selectively engaging the pawl with said notches whereby the time of releasing the latch to effect engagement of the clutch may be varied.

11. In a machine of the class described, the combination with a reciprocatory shear device and actuating mechanism therefor including a clutch, of a clutch-controlling mechanism including a latch normally holding the clutch inoperative, a trip member having a shiftable connection with the latch, and means for selectively operating said connection to trip the latch at different points in the travel of the trip member.

12. In a machine of the class described, the combination with a reciprocatory shear device and actuating mechanism therefor including a clutch, of a clutch-controlling mechanism including a latch normally holding the clutch inoperative, said latch having spaced notches, a trip lever having a pawl cooperating with said notches of the latch, and means for selectively engaging the pawl with said notches whereby the time of releasing the latch to effect engagement of the clutch may be varied.

In testimony whereof I affix my signature.

OTTO M. HOCH.